United States Patent Office 3,426,353
Patented Feb. 4, 1969

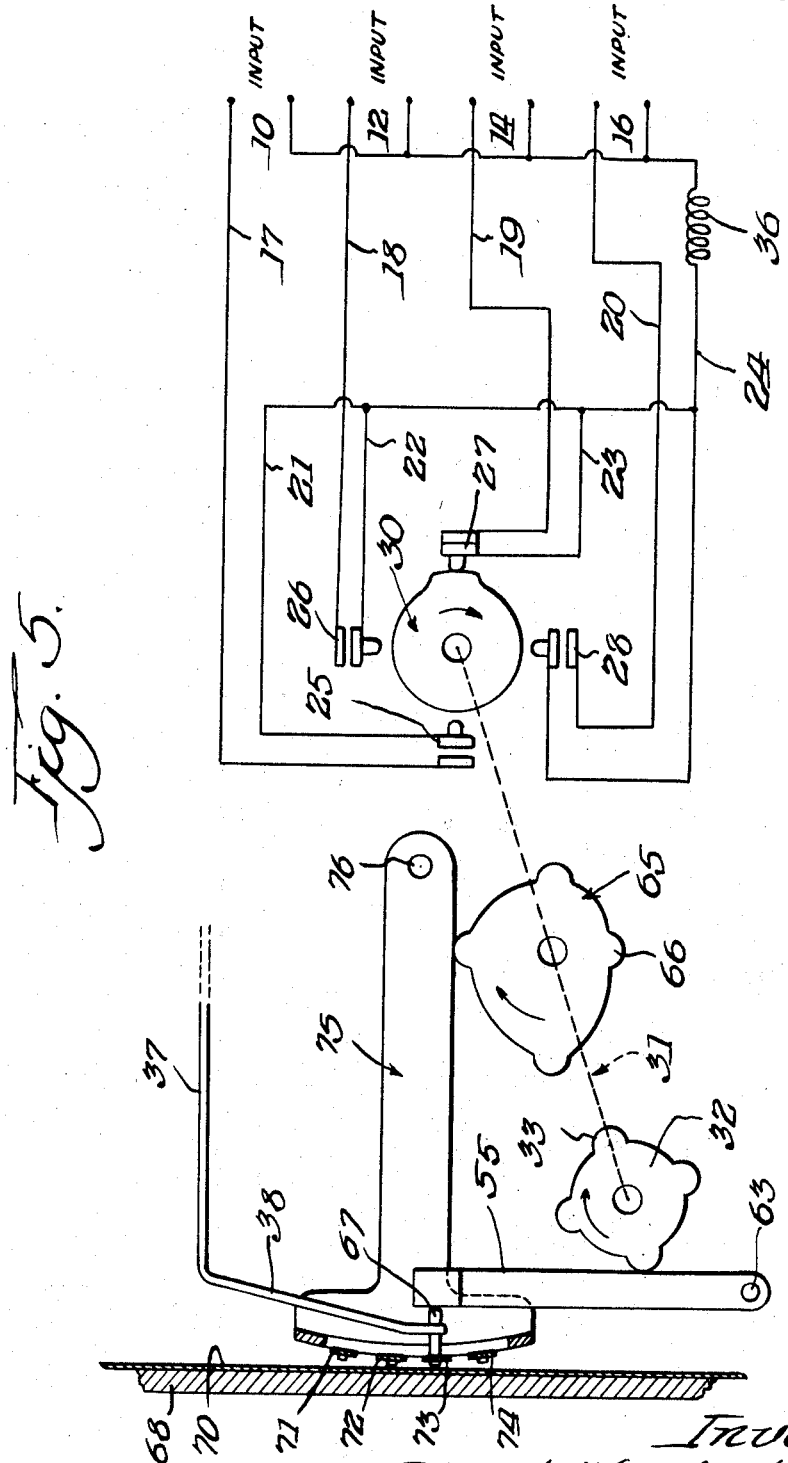

3,426,353
MINIATURE RECORDER RECEIVER
David H. Thorburn, Oak Park, Ill., assignor to The Powers Regulator Company, Skokie, Ill., a corporation of Illinois
Filed Aug. 2, 1966, Ser. No. 569,683
U.S. Cl. 346—50          9 Claims
Int. Cl. G01d 9/28, 9/36

The invention relates to recording instruments capable of recording a plurality of variables each having a distinctive trace pattern and which may be recorded on either a strip chart or on a circular chart.

The recording instrument of the invention is adapted to measure sequentially a plurality of signals, either electrical or pneumatic, and which actuate a meter movement in accordance with the level of the signal. For a recorder of this type, the invention has for an object to provide an indexing turret for storing a plurality of styli, wherein each stylus is correlated with a particular signal and wherein each stylus will print in a particular color or in a distinctive manner so that the respective printings on the chart can be subsequently related to one of the input signals.

Another object is to provide a recording instrument having a plurality of styli and which are stored in an indexing turret except the one in use and wherein novel means are employed for indexing the turret and for sequentially changing the stylus on the meter pointer arm each time the meter is in the off position between switching from one signal to the next.

Another object of the invention is to provide mechanism for a recording instrument of the type herein described which will sequence all the operations of indexing a stylus holding turret, operating a selector switch and actuating a striker bar, the said bar upon being actuated causing the selected stylus to print identifying indicia on a chart provided for the purpose.

Other objects of the invention are to provide a recording instrument which will avoid the time error that is usual in multiple pin recorders due to the clearance needed between pins so that they may pass each other, and a recording instrument which will also avoid pin friction by having a free moving stylus arm except at the instant of printing.

With these and various other objects in view, the invention may consist of certain novel features of construction and operation as will be more fully described and particularly pointed out in the specification, drawings and claims appended thereto.

In the drawings which illustrate an embodiment of the device and wherein like reference characters are used to designate like parts:

FIGURE 4 is a chart showing the sequence in the operations of the cams and indexing means for the recording instrument of FIGURE 1; and FIGURE 5 is a diagrammatic view illustrating a modified form of a recording instrument coming within the invention.

The present recorder is adapted to measure sequentially a plurality of input signals which are supplied by circuits having electrical connection with a meter movement. The meter movement, when energized, is operated to an extent which is proportional to the level of the signal. A meter pointer coacts with a plurality of styli stored in a rotatable turret, and said turret is rotated in timed relation with the sequential signal scanning mechanism. The several units and elements basically comprising the recording mechanism as regards the form shown in FIGURE 1 includes the input circuits 10, 12, 14 and 16 which receive electrical signals to be measured and recorded by the present instrument. Conductors 17, 18, 19 and 20, and conductors 21, 22, 23 and 24 are in electrical connection with the switch contacts 25, 26, 27 and 28, respectively, and the said contacts are sequentially actuated to close their particular input circuit by the signal sequence cam 30.

Figure 1:
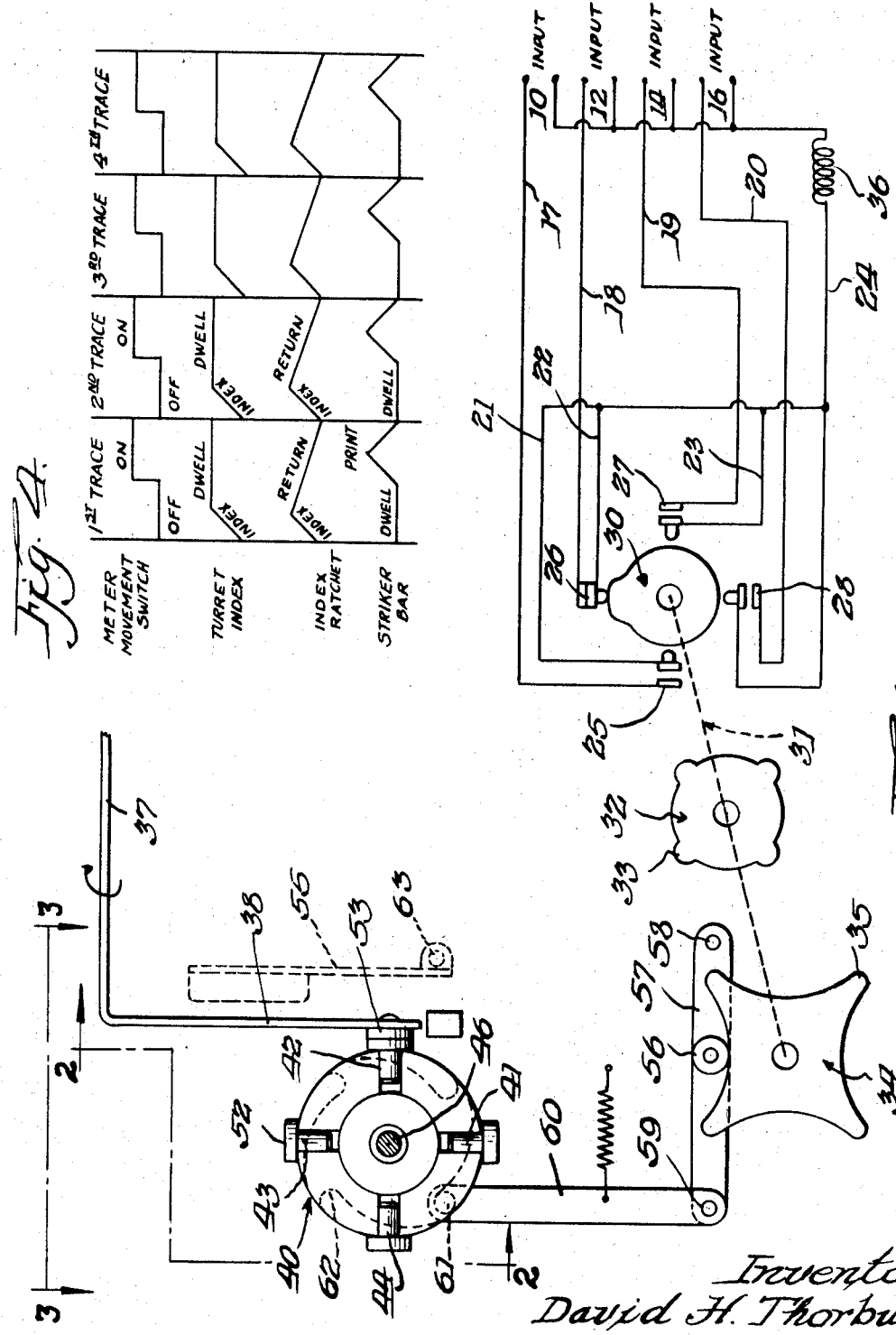
FIGURE 1 is a view showing in diagrammatic form a recording instrument which embodies the improvements of the invention.

The cam 30 is mounted on and fixed to shaft 31 so as to rotate therewith and the said shaft is in turn journalled for rotation in the frame of the recording instrument. Additional cams are mounted on and fixed to the shaft such as the strike-bar cam 32 having the projections 33 and the indexing cam 34 having the projections 35. FIGURE 1 does not show the precise relation of the various cams with each other. However, all of the cams are driven in unison and at the same speed by conventional power means, not shown, which is provided for rotating the shaft 31 at the speed that is desired for recording purposes.

When the cam portion of the signal sequence cam 30 engages the contacts 26, it closes the input circuit 12, and the meter movement 36 located in the common conductor 24 is energized and actuated to an extent which is proportional to the electrical intensity of the signal for said circuit. The meter movement is operatively connected, either mechanically or electrically, to a meter pointer 37 having an arm 38, and it will be understood that said meter pointer is capable of rotation so that the arm 38 will have movement in a plane which is perpendicular to the paper as shown in FIGURE 1. The magnitude of the pivotal movement of the meter pointer 37 is proportional to the intensity of the signal energizing the meter movement 36. Thus for a high intensity signal the pivotal movement of the meter pointer will be greater than for a signal of lower intensity and thus the displacement of the arm 38 from a straight down depending position to a lateral position will be such as to indicate the strength of the signal each time the meter movement is energized by the closing of the input circuit 12. The other input circuits will effect actuation of the meter movement 36 in a similar manner to cause a pivotal movement of the meter pointer 37 and a displacement of the arm 38 proportional to the intensity of the particular input signal which is in electrical connection with the said meter movement at the time.

Figure 2:
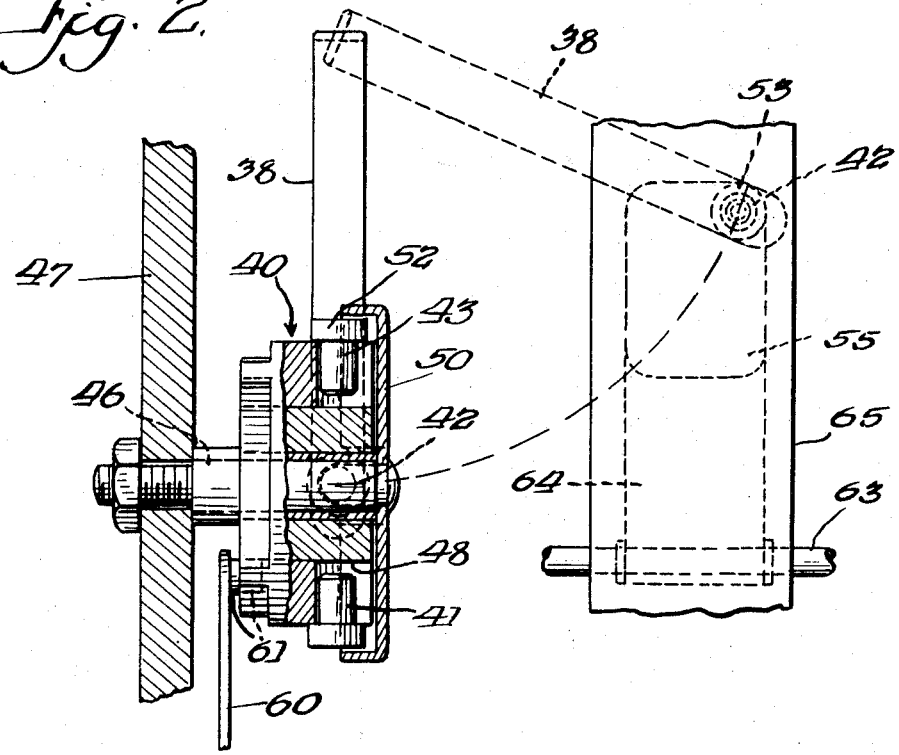
FIGURE 2 is a view taken along line 2—2 of FIGURE 1 and looking to the right in the direction of the arrows with a portion of the turret 40 broken away.

FIGURE 2 shows the details of the rotatable turret 40 for storing a plurality of styli which are indicated by the numerals 41, 42, 43 and 44, each one relating to a particular input signal. Thus stylus 41 is correlated with the input circuit 10, stylus 42 with the input circuit 12, stylus 43 with the input circuit 14, and stylus 44 with the input circuit 16. The hub 45 of the turret is mounted for rotation on the stud shaft 46 which projects from the instrument panel 47. The hub is recessed in four places as at 48, having a ninety degree angular displacement with each other, and each recess accommodates a stylus. The stylus is normally retained in its recess by the retainer plate 50 which is fixedly carried by the stud shaft 46. However, the retainer plate is slotted at 51 to permit the release of a stylus from its recess when the same is positioned opposite the slot. For this purpose the head 52 of each stylus is magnetized and the depending arm 38 is provided with a steel button 53, FIGURE 1, which is adapted to attract and retain the stylus when the two are brought into contacting relation.

Figure 3:
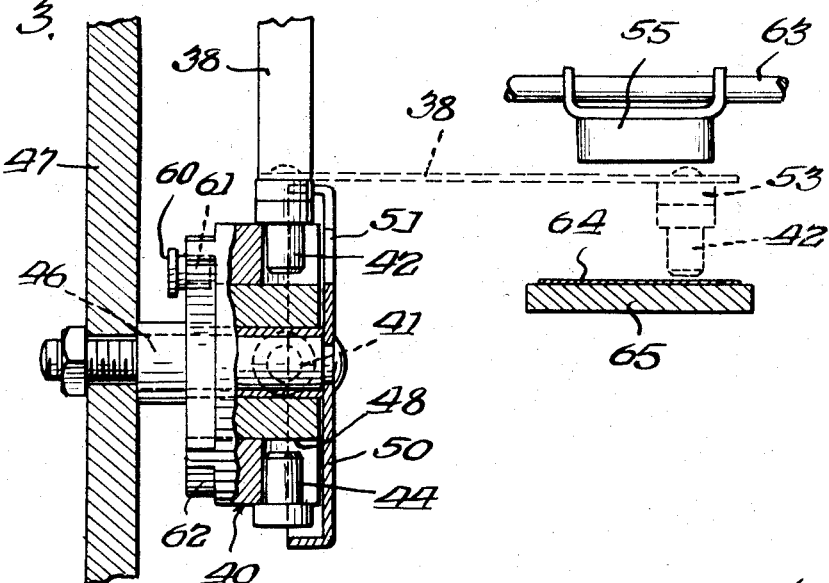
FIGURE 3 is a top plan view taken substantially along line 3—3 of FIGURE 1 with a portion of the turret 40 broken away.

The invention contemplates the magnetization of the head 52 of each stylus so that when the head is caused to contact the steel button 53 the magnetized stylus will be releasably adhered to the button and thus to the arm 38 of the meter pointer. Thus when the meter pointer is rotated to swing the arm laterally as shown in FIGURES 2 and 3, the button 53 will carry with it a magnetized stylus so as to locate the stylus in the vicinity of the recording chart. When a selected stylus is located adjacent the recording chart the striker-bar 55 is actuated by the striker-bar cam 32 to cause a printing of the indicia on the stylus to take place in a manner as will be presently described.

Following the printing operation the arm 38 returns to its depending position and thus the stylus which is magnetically adhered thereto is returned to its recess 48 in the turret 40. The turret can now be indexed to bring the next stylus into magnetized contact with the button 53. The indexing mechanism as shown in FIGURE 1 includes the indexing cam 34 on the rotating shaft 31. The periphery of the cam which includes the projections 35 is in contact with a roller 56 carried by the lever 57 which is pivoted at 58. The free end of the lever 57 is pivotally connected at 59 to a link 60 which is provided at its top upper end with a pin 61. The pin rides on the periphery of the turret which is shaped so as to provide a plurality of arcuate tapering recesses 62 for receiving the pin 61. Four of such recesses are provided since four indexed positions are required for the four styli. When the roller 56 rides up over a cam portion 35 the lever 57 is elevated to elevate the link and pin to effect an indexing rotation of the turret 40. As a result of this indexing rotation, the stylus 42 is stripped from the button 53 and the next stylus 43 is caused to be magnetically adhered to the button.

The indexing of the styli will take place in timed relation with the sequential operations performed by the signal sequence cam 30 and also by the striker bar cam 32. As shown in the chart of FIGURE 4 the indexing of the turret takes place when the input circuits are open and when the meter movement remains unenergized. With stylus 42 having been stripped from the button 53 and stylus 43 now in magnetic contact with the button, the parts are in condition for the next energization of the meter movement which will take place when the high portion of the signal sequence cam 30 engages and closes the contacts 27 to in turn close the input circuit 14.

With the closing of the input circuit 14 the meter pointer 37 will be rotated and the arm 38 will be displaced laterally to an extent proportional to the strength of the input signal. When the position of the arm and thus the stylus carried by the arm have stabilized, the striker bar cam 32 will have rotated to cause one of the projections 33 to actuate the striker bar 55 which is pivotally supported at 63. This actuation of the striker bar is transmitted to the stylus and the stylus is caused to contact the strip chart 64, FIGURE 3, and print its particular mark on the chart. The chart is backed by the plate 65 and conventional means are employed to import the desired movement to the chart.

The invention thus provides a recording instrument wherein a plurality of styli are employed for recording a plurality of variables, each of the styli being related to a particular variable and which will print in its distinctive color or indicia so that the respective printings on the chart can be related to a particular variable. Also, the styli are retained in an indexing turret from which the styli are sequentially removed and caused to print their relative position on the chart. Following the printing operation, the stylus is returned to its recess in the turret, the turret is indexed, and the cycle of operations is repeated for the next stylus in turn.

In the modification of FIGURE 5 the same input circuits are shown and the contacts are closed in sequence by the cam 30 in the same manner described for FIGURE 1. Also the shaft 31 is journalled by the frame of the recording instrument and said shaft has the cam 30 and the striker bar cam 32 fixed thereto. However, in this modification the indexing cam is replaced by the printer membrane cam 65. This cam is irregular in shape and the cam has the projections or cam portion 66 formed on its periphery.

The meter movement 36 is energized each time an input circuit is closed and the energization will be in proportion to the strength of the input signal. The meter pointer 37 will be rotated to a commensurate extent and the displacement of the arm 38 will thus be in proportion to the signal strength of the particular input circuit. The arm 38 in this modification carries at its depending end a pressure transfer pin 67 and said pin is adapted to receive periodic blows from the striker bar 55 pivoted at 63. This actuation of the striker bar takes place as a result of the cam projections 33 on cam 32 which periodically contact the striker bar, as will be clearly understood from FIGURE 5.

The numeral 68 indicates a backing plate for the strip chart 70. This form of the invention locates a plurality of membrane printer strips immediately adjacent the chart paper. A strip is provided for each of the input circuits. Accordingly, the membrane printer strip 71 is correlated with the input circuit 10, strip 72 with the input circuit 12, strip 73 with the input circuit 14, and strip 74 with the input circuit 16. The strips extend transversely across the width of the chart paper and the strips are carried in the vertically spaced relation as shown by the carrier 75 which is pivotally supported at 76. Up and down movement of the carrier 75 is effected by the cam 65 and this accounts for the irregular shape of the cam. When the cam has elevated the carrier to its maximum extent the membrane strip 74 will be located in alignment with the pin 67. When the carrier is lowered to its next position the strip 73 will be located in alignment with the pin. In a similar manner the strip 72, and finally strip 71, will be aligned with the pressure transfer pin 67. The membrane strips will have a particular indicia or design on their printing surface and thus when the striker bar is caused to strike the pin, a printing takes place on the chart, and which is characterized by the particular membrane strip in alignment with the pin at the time. Accordingly the respective printings on the chart can be correlated with a particular input circuit.

The invention is not to be limited to or by details of construction of the particular embodiment thereof illustrated by the drawings as various other forms of the device will, of course, be apparent to those skilled in the art without departing from the spirit of the invention or the scope of the claims.

What is claimed is:

1. In a recorder of the character described, the combination with a chart upon which a record is to be made, of a plurality of input variables and a meter movement which is periodically rendered operative by the respective input variables in sequence, a meter pointer having an arm and which is displaced by operation of the meter movement to an extent proportional to the magnitude of the particular input variable, a printing member corresponding to each of the input variables and having an identifying characteristic whereby the printing effected by the member can be related to its respective input variable, and means actuating the printing members individually and in sequence to cause the members to print on the chart, said means effecting actuation of each printing member when the arm of the meter pointer is in said displaced position and at a location on said chart defined by said displaced position of said arm.

2. A recorder of the character as described in claim 1, wherein first cam means are employed for rendering the meter movement operative in sequence by the respective input variables, and wherein second cam means are employed for actuating the printing members individually and in sequence to cause the members to print on the chart, said first and second cam means having operation in timed relation with each other.

3. In a recorder of the character described, the combination with a chart upon which a record is to be made, of a plurality of input circuits and a meter movement which is periodically energized by the electrical signal of the respective input circuits in sequence, a meter pointer having an arm and which is displaced by energization of the meter movement to an extent proportional to the magnitude of the particular input signal, an indexing turret for storing a plurality of styli each of which has an identifying printing characteristic, means carried by the arm and capable of magnetically attracting and causing a particular stylus to releasably adhere to the said means when the turret is in an indexed position, whereby the adhered stylus is removed from the turret and displaced when the arm is displaced by energization of the meter movement, other means for actuating the stylus when thus displaced to cause the same to print on the chart, and indexing means for indexing the turrent following the printing operation and after the stylus has been returned to the turret.

4. A recorder of the character described by claim 3, wherein each of the styli have a magnetized head and wherein the means carried by the arm comprises a steel button.

5. A recorder of the character described by claim 3, wherein first cam means are employed for energizing the meter movement by the electrical signal of the respective input circuits in sequence, and wherein second cam means are employed for actuating the displaced stylus to cause the same to print on the chart, the first and second cam means having operation in timed relation to each other.

6. A recorder of the character described in claim 3, wherein the indexing turret provides a recess for each stylus and which occupies its recess except when rendered operative for printing purposes, and wherein the means for indexing the turret is of the ratchet type and is cam actuated.

7. In a recorder of the character described, the combination with a chart upon which a record is to be made, of a plurality of input circuits and a meter movement which is periodically energized by the electrical signals of the respective input circuits in sequence, a meter pointer having an arm and which is displaced by energization of the meter movement to an extent proportional to the magnitude of the particular input signal, a pressure transfer pin carried by the arm, a plurality of membrane printing strips located adjacent the chart and between the same and the transfer pin, said membrane printing strips extending transversely of the chart and being spaced in a direction along the length of the chart, means for indexing the membrane printing strips by moving the same bodily to locate a selected strip in alignment with the transfer pin, and means for actuating the pressure transfer pin by striking the same to cause the pin to contact the aligned membrane strip and print on the chart, said means actuating the pressure transfer pin to cause a printing to take place when the arm and thus the pin is in said displaced position.

8. A recorder of the character described by claim 7, additionally including a carrier for the plurality of membrane printing strips, means pivotally supporting the carrier for indexing movement whereby the selected printing strip is located in alignment with the transfer pin, and cam means for producing said indexing movement of the carrier.

9. A recorder of the character described by claim 7, wherein each membrane printing strip has an identifying characteristic on its printing surface.

References Cited
UNITED STATES PATENTS

| | | | |
|---|---|---|---|
| 1,660,921 | 2/1928 | Fischer | 346—34 |
| 2,269,240 | 1/1942 | Andersen | 346—17 |
| 3,034,125 | 5/1962 | Gozenbach | 346—79 |
| 2,467,929 | 4/1949 | Colt | 346—50 |
| 2,778,710 | 1/1957 | Komas. | |
| 2,899,258 | 8/1959 | Spracklen | 346—32 |

STEPHEN J. TOMSKY, *Primary Examiner.*

EDITH C. SIMMONS, *Assistant Examiner.*

U.S. Cl. X.R.

346—17, 34, 139